Feb. 13, 1923.

G. P. ALTENBERG.

HEAT INSULATED JAR AND CASING THEREFOR.

FILED FEB. 8, 1919.

1,445,056.

Inventor:
George P. Altenberg,
By A. D. Herbert,
Attorney.

Patented Feb. 13, 1923.

1,445,056

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

HEAT-INSULATED JAR AND CASING THEREFOR.

Application filed February 8, 1919. Serial No. 275,876.

*To all whom it may concern:*

Be it known that I, GEORGE P. ALTENBERG, a citizen of the United States, residing at Cincinnati, in the county of Hamilton and State of Ohio, have invented certain new and useful Improvements in Heat-Insulated Jars and Casings Therefor, of which the following is a specification.

It is the object of my invention to provide a heat-insulated jar and casing therefor of simple construction so arranged that the same may be readily assembled; further, to provide a wide-mouthed glass heat-insulated jar and a casing therefor so constructed that the mouth-end of the glass jar projects to substantial extent through the mouth-end of the casing so as to avoid contact between the food contents of the glass jar with the casing parts in inserting or removing the contents; further, to provide simple means for forming a tight joint between the mouth-ends of the inner glass vessel and the mouth-end of the casing; and, further, to provide simple means for holding the inner glass vessel in place in the casing, and for securing the top to the casing.

The invention will be further readily understood from the following description and claims, and from the drawings, in which latter:

Figures 1, 2, 3:
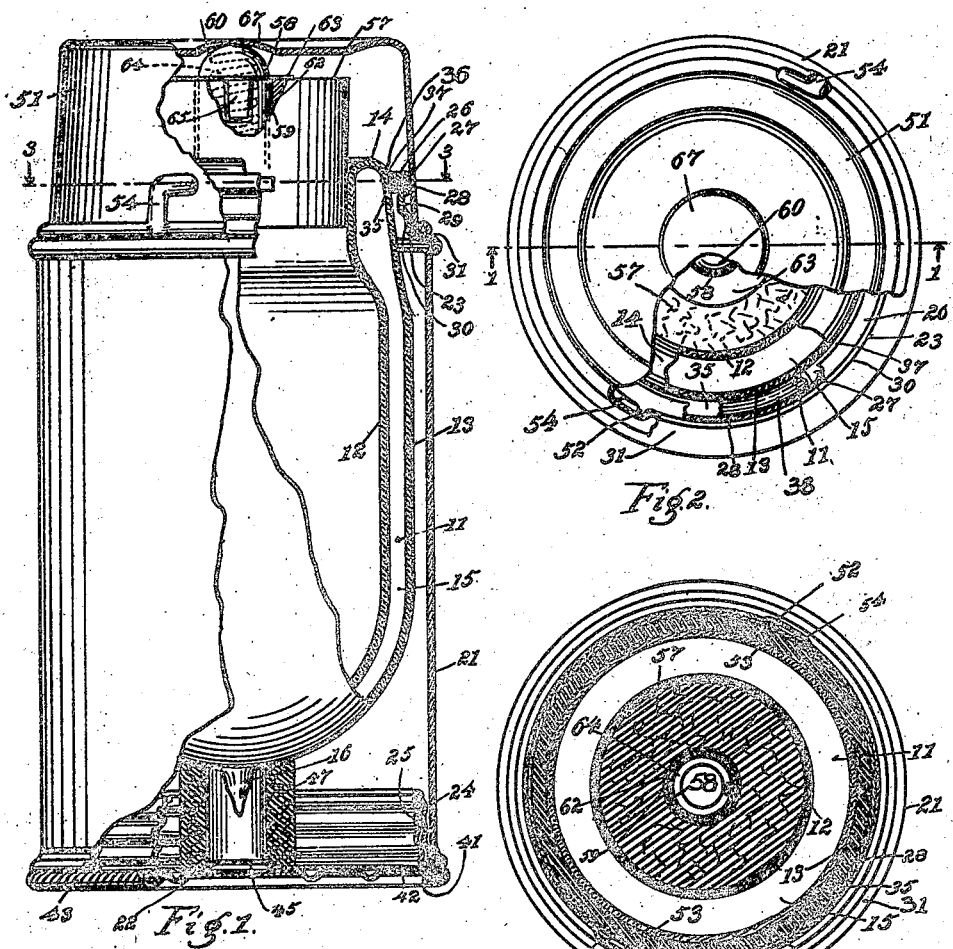
Fig. 1 is a side elevation of my improved device, partly broken away, and partly in axial section on the line 1—1 of Fig. 2.
Fig. 2 is a plan view of my improved device, partly broken away.
Fig. 3 is a plan section of the same, taken on the line 3—3 of Fig. 1.
Figures 4, 5, 6:
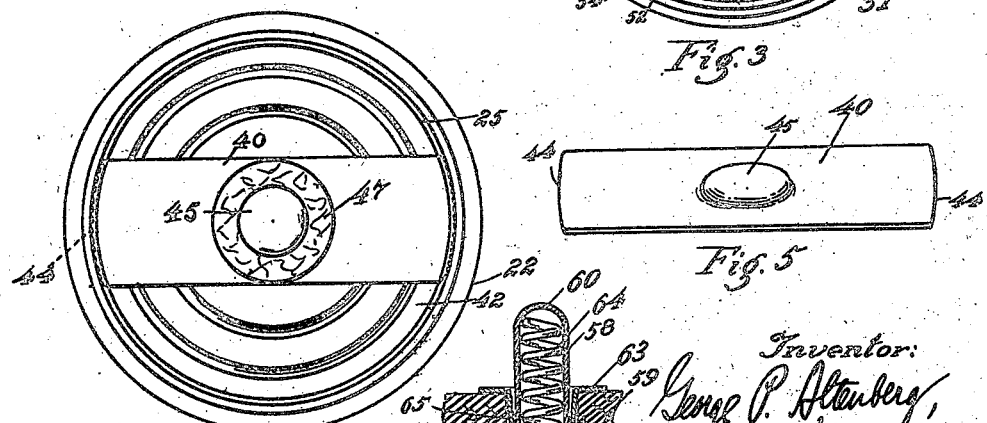
Fig. 4 is a plan view of the base-member of the casing.
Fig. 5 is a perspective view of the lower positioning strip.
Fig. 6 is a sectional detail view, taken on the line 1—1 of Fig. 2.

11 represents the inner vessel, exemplified as a glass vessel comprising an inner wall 12 and an outer wall 13, connected at the mouth-end of the vessel by means of a cross-seal 14, there being a heat-insulated space 15 between said walls, this being preferably a vacuum-insulated space, the vacuum being created through a suitable teat 16, which is sealed to retain the vacuum in the space. The inner surface of the wall of the space may be provided with a suitable silver coating introduced through the teat prior to exhausting the air in the space.

The casing is represented as comprising a body-member 21 and a base-member 22, the body-member having a reduced mouth-end or neck 23. The base-member is connected to the body-member by thread connecting means, comprising a threaded flange 24 fast in the lower end of the body-member, and a threaded flange 25 forming a fixed part of the base-member. The mouth-end of the body-member terminates in an inwardly radially extending flange 26, forming an annular recess 27, the outer wall 28 of which is shown as substantially cylindrical. Below this annular recess there is an outer inwardly extending annular groove 29, at the bottom of which there is an outwardly extending annular enlargement 30. At the base of this annular enlargement, the casing is provided with an outwardly extending annular shoulder 31, forming the base of the neck-portion of the body-member.

A cushion-ring 35 is received in the annular recess 27 and is exemplified as a resilient compressible cushion-ring, for instance of rubber. The inner peripheral face of this cushion-ring is preferably of smaller diameter than the diameter of the inner peripheral face of the edge of the flange 26 to permit substantial compression of the cushion-ring.

The inner vessel is, adjacent to its mouth-end, provided with an outer tapering portion 36 tapering with a substantially long taper toward the cross-seal 14, whereby the outer wall is at its mouth-end provided with a substantially long taper tapering toward the mouth-end of the inner vessel and toward the axis of the vessel. What may be termed a tapering neck is thereby formed at the mouth-end of the inner vessel received in the neck of the casing.

In assembling the parts, the tapered neck of the inner vessel extends through the annular cushion-ring 35 and the inwardly radially extending flange 26, the tapered neck of the inner vessel acting on said cushion-ring to compress the same radially into its annular recess, end pressure being exerted between the inner member and the casing, so that the pressure on the cushion-ring is toward the flange 26 and the outer wall 28 of the annular recess 27, the outer face of the tapered wall being slightly spaced, as 1 shown at 37, from the inner edge of the flange 26, when the parts are fully assembled.

By these means a close joint is provided between the inner vessel and the casing which will prevent the leakage or seepage of any moisture into the space between the inner vessel and the casing. At the same time the parts are readily disconnected for cleaning purposes or for renewal of any of the parts. The rubber cushion-ring is inexpensive and readily replaced, so that a secure joint between the parts may always be assured. The casing is preferably made of sheet metal. The form of the neck of the inner vessel also insures central positioning of said mouth-end of the inner vessel with relation to the mouth-end of the casing.

Means are also provided for centering and retaining the bottom of the inner vessel with relation to the casing. This is accomplished, in the present exemplification, by means of a metal strip 40, shown as a flat strip, positioned in the base-member. This positioning is accomplished by providing the base-member with a slight annular recess 41 between the upwardly extending threaded flange 25 thereof and the bottom wall 42; the latter having its peripheral edge turned over upon the outwardly extending flanged lower end of the threaded flange, being curled over the flange of said outer end and provided with a suitable knurl, shown at 43, whereby the base-member is readily gripped and turned with relation to the body-member. The strip 40 is preferably provided with outer arcuate ends 44, the latter fitting into said annular recess 41, and impinging the outer wall of said recess, thereby positioning the strip centrally with relation to the base-member.

The strip 40 is provided with a central upward bulge 45. The inner member is provided with the central or axially depending teat 16. A cushion-sleeve 47, for instance of cork, is received about the central bulge and the teat, the bulge and teat being received in the bore of the sleeve. The bottom of the inner member is provided with a tapering outer surface at the teat, receding away from the cushion-sleeve. The pressure of the cushion-sleeve upon this tapered bottom axially of the jar causes centralizing pressure between the sleeve and the bottom of the inner member, whereby the bottom end of the inner member is centrally positioned with relation to the casing. The cushion-sleeve is preferably secured to the strip 40, as by means of a suitable cement.

A top, shown at 51, is provided for the jar. It is preferably slightly tapering outwardly toward its lower end and is arranged to have its iner face contact the outer peripheries of the outer wall 28 and the enlargement 30, with its lower end resting on the annular shoulder 31.

For securing the parts in place in simple manner, I provide the wall 28 with outwardly struck lugs 52, struck outwardly from the inside of the annular recess 27, whereby outwardly laterally extending recesses 53 are formed in said wall. The top is provided with a bayonet slot 54 for each of the lugs, shown as comprising a portion extending lengthwise of the jar and a portion extending laterally from the latter portion, this laterally extending portion being slightly inclined toward the top face of the top for acting with a screw effect on the top to firmly close the same upon the casing. The seating of the tapered neck of the inner member against the annular cushion-ring 35 acts to press the portions of the cushion-ring opposite the recesses 53 into said recesses for insuring a tight joint at said lugs. The top of the jar, may if desired, be used as a cup or dispensing vessel.

A suitable stopper 57, as of cork, is received in the mouth of the inner vessel. Means are preferably provided for holding the stopper in place against pressure in the inside of the vessel resulting, for instance, from the closure of the stopper upon highly heated contents emitting steam. These means comprise telescoping tubes 58, 59, the opposite ends of which are closed, as shown at 60, 61. The outer one of these telescoping tubes is pressed into and firmly held in a hole 62 in the stopper, the outer end of the said tube being provided with a laterally extending flange 63 resting on top of the stopper.

There is a spring 64 in the tubes between their closed ends, acting to cause separating movement between the tubes. The endwise separating movement between the tubes is limited by means of limiting lips 65 struck up from the wall of the outer tube, the upper ends of the lips being integral with the tube and the lower ends extending inwardly of the tube. The inner tube is provided at its inner end with an annular flange 66, which is pressed inwardly past the lips, the lips contracting the annular flange upon outward movement caused by the spring, and thereby limiting outward movement of the outwardly extending tube. When the top is placed on the casing, it acts to compress the spring and thereby firmly press the stopper in place. The outer end of the outwardly extending telescoping tube, which is shown rounded, is received in an upwardly extending central recess 67 in the upper wall of the top.

Having thus fully described my invention, what I claim as new and desire to secure by Letters Patent, is:

1. In combination, an inner vessel comprising an inner wall and an outer wall connected at the mouth of said vessel by a cross-seal, said walls having a heat-insulated space therebetween, the mouth-end of said outer wall being tapered toward said cross-seal, a casing, a top therefor, said casing comprising a mouth-section and a base-section, said mouth-section having a mouth-end provided with a radially inwardly extending flange to form an annular recess comprising said flange and an outer wall, said last-named wall provided with outwardly pressed lugs forming recesses in the inner face of said last-named outer wall, said top having slots coacting with said lugs to form connecting means between said casing and said top, an annular resilient cushion-ring in said annular recess, and means for moving said casing-sections toward one another to connect the same, whereby axial movement is caused between said tapered outer wall and said mouth-section to press said annular cushion-ring outwardly in said annular recess and into said lug-forming recesses.

2. In a vacuum insulated food jar, the combination of a vacuum-insulated inner member and a casing therefor, said inner member having a tapering neck-portion, said casing provided with a neck-portion the upper end whereof has an annular inturned flange forming an annular recess therebelow, a cushion-ring in said recess, said tapering neck-portion of said inner member received through said cushion-ring and said inturned flange, resilient means between said casing and said inner member to hold said inner member in said casing, the mouth-end of said neck-portion of said casing provided with outwardly struck lugs, a top provided with coacting slots to connect said top and said casing, a stopper for said inner member, and spring-means between said stopper and top secured to said stopper, said top provided with a central recess, and said spring-means provided with a coacting face received in said central recess to center said spring-means.

In testimony whereof, I have hereunto signed my name in the presence of two subscribing witnesses.

GEORGE P. ALTENBERG.

Witnesses:
 IVY M. PENCE,
 CARL NASSE.